United States Patent [19]

Ujihashi et al.

[11] Patent Number: 5,329,527
[45] Date of Patent: Jul. 12, 1994

[54] INTER-LOCAL AREA NETWORK CONNECTING SYSTEM

[75] Inventors: Yoshihiro Ujihashi; Toshihiro Shikama; Kiyoshi Watanabe, all of Kanagawa, Japan

[73] Assignee: Mitsubishi Denki Kabushiki Kaisha, Tokyo, Japan

[21] Appl. No.: 743,750

[22] Filed: Aug. 12, 1991

[30] Foreign Application Priority Data

Aug. 27, 1990 [JP] Japan .................................. 2-225935

[51] Int. Cl.⁵ .............................................. H04J 3/02
[52] U.S. Cl. .................................................. 370/85.13
[58] Field of Search ................. 370/85.13, 85.9, 85.14, 370/94.1, 95.1, 85.7, 58.2, 62, 85.1, 79

[56] References Cited

U.S. PATENT DOCUMENTS

| | | | |
|---|---|---|---|
| 4,737,953 | 4/1988 | Koch et al. | 370/94 |
| 4,933,937 | 6/1990 | Konishi | 370/85.13 |
| 5,214,646 | 5/1993 | Yacoby | 370/85.14 |
| 5,220,562 | 6/1993 | Takada et al. | 370/85.13 |

FOREIGN PATENT DOCUMENTS 0156542 5/1987 European Pat. Off. .
3904403 6/1988 Fed. Rep. of Germany .

OTHER PUBLICATIONS

Yamazaki et al, "Connectionless Cell Switching Schemes for Broadband ISDN," XIII International Switching Symposium, May 27–Jun. 1, 1990, Proceedings vol. VI, pp. 5–10.

Eckart Mattias et al. "Strategy for an ATM Interconnect Network," XIII International Switching Symposium, May 27–Jun. 1, 1990, Proceedings vol. IV, pp. 29–33.

Proceedings of International Switching Symposium–IEEE Infocom '90.

Primary Examiner—Douglas W. Olms
Assistant Examiner—Shick Hom
Attorney, Agent, or Firm—Wolf, Greenfield & Sacks

[57] ABSTRACT

An inter-local area network (LAN) connecting system in which LANs are connected to an asynchronous transfer mode (ATM) switching network by respective bridge devices to effect communication between terminals connected to different LANs through the bridge devices and the switching network. Logical connections are set between the bridge devices in advance to transfer cells, which are information units of data transfer. Each of the bridge devices has a first address table on which the addresses of terminals connected to a LAN accommodated in this bridge device are registered and held by learning, a second address table on which the addresses of terminals connected to LANs accommodated in other bridge devices are registered and held by learning in pairs with identifiers that identify logical connections between this bridge device and the other bridge devices, and means for checking the identifier of a received information frame or received cell against the first or second address table to judge the destination in accordance with the registration condition of the first or second address table, and effecting communication on the basis of the result of the judgement.

7 Claims, 9 Drawing Sheets

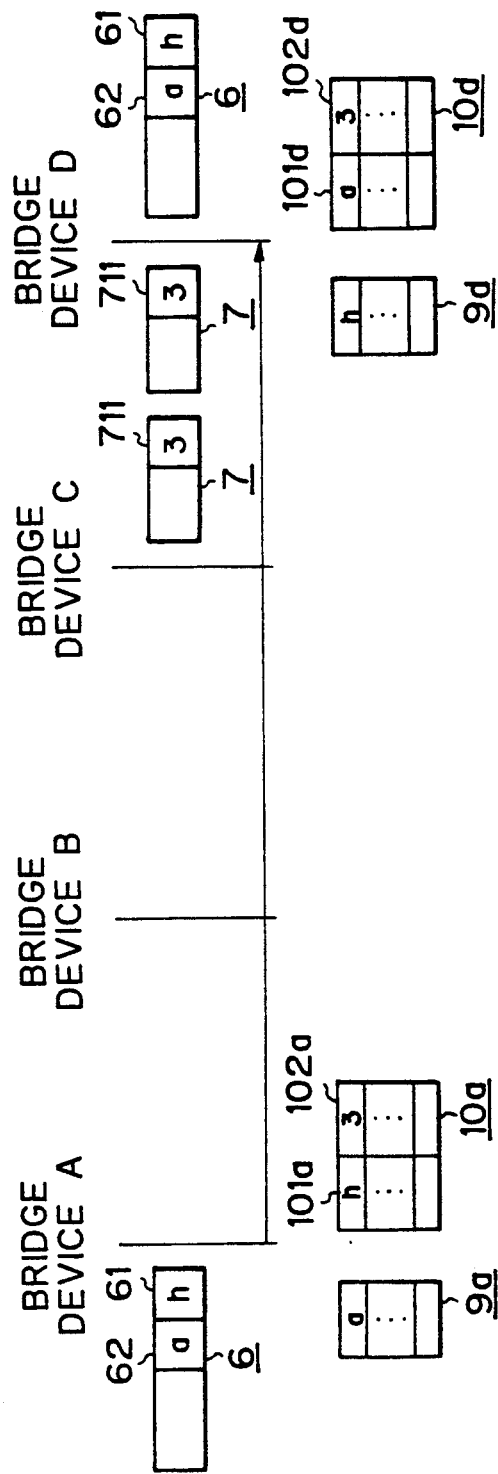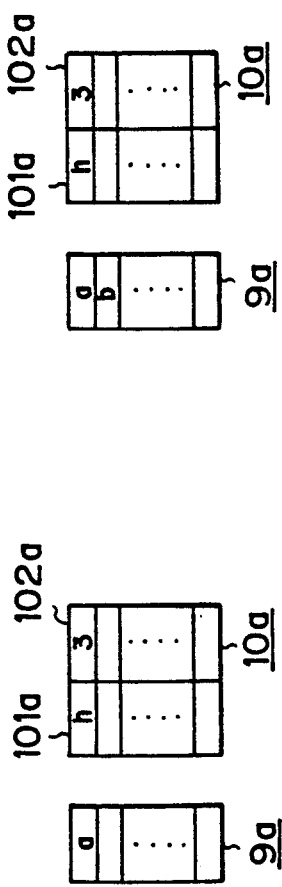

INTER-LOCAL AREA NETWORK CONNECTING SYSTEM

BACKGROUND OF THE INVENTION

The present invention relates to an inter-LAN (Local Area Network) connecting system for effecting communication between terminals connected to different LANs through ATM (Asynchronous Transfer Mode) exchanges.

FIG. 9 is a block diagram of a system tidal makes a connection between LANs by means of an ATM switching network in which data is divided into data units, called cells, each having a predetermined length, to effect data transfer for each cell as a unit. In FIG. 9, reference numerals 1a to 1d denote bridge devices A to D which accommodate respective LANs 4a to 4d, 2a to 2d ATM exchanges A to D which constitute an ATM switching network 3, and 5a to 5h terminal devices (hereinafter referred to as simply "terminals") a to h which are connected to the corresponding LANs 4a to 4d. In the following description, when designated individually, the terminals are denoted by 5a to 5h, whereas, widen designated generally, the terminals are denoted by 5. The same rule applies to other portions and also in other drawings.

FIG. 10 shows the arrangement of an information frame (known as "media access control frame"; hereinafter referred to as "MAC frame") 6 that flows on the LANs 4.

The MAC frame 6 comprises a destination address 61, an originating address 62 and an information portion 63. FIG. 11 shows the arrangement of a cell 7 that is transmitted through the ATM switching network 3. The cell 7 comprises a header portion 71 including a virtual channel identifier (hereinafter referred to as "VCI") 711, and an information portion 72.

The operation of a typical conventional inter-LAN connecting system will next be explained.

Each bridge device 1 has an address table 11 on which have previously been registered the addresses of terminals 5 connected to the LAN 4 accommodated in this bridge device 1, and an address table 12 on which have previously been registered the addresses of terminals connected to the LANs 4 accommodated in other bridge devices 1, together with the addresses of these bridge devices 1, as shown in FIG. 13.

First, when a bridge device 1 receives a MAC frame 6 from the LAN 4 accommodated therein, it checks the destination address 61 of the received MAC frame 6 against the address table 11. If the destination address 61 has been registered thereon, it means that the destination of the MAC frame 6 is a terminal 5 in the LAN 4 accommodated in this bridge device 1; therefore, the received MAC frame 6 is abandoned. If the destination address 61 is not on the address table 11, the address table 12 is searched to identify a bridge device 1 which accommodates a LAN 4 including the terminal 5 whose address is coincident with the destination address 61, thus deciding a bridge device 1 to which the received MAC frame 6 should be transferred.

Then, each time the bridge device 1 receives a MAC frame 6 similar to the above, it issues a call request to the ATM exchange 2, in which the bridge device 1 is accommodated, to make a connection with the destination bridge device 1 in order to transfer cells 7 prepared from the MAC frame 6. Upon receiving the call request, the exchange 2 sets a path to an exchange 2 that accommodates the destination bridge device 1 and also a path from the destination exchange 2 to the destination bridge device 1. The exchange 2 further informs the calling bridge device 1 of a VCI 711 for identification of the set paths. Upon obtaining the VCI 711, the bridge device 1 divides the MAC frame 6 into a plurality of cells 7 each having a predetermined length, as shown in FIG. 12, and transfers the cells 7 to the destination bridge device 1 through the set paths. The bridge device 1 on the reception side assembles cells 7 received sequentially into a MAC frame 6, as shown in FIG. 12, and transmits it to the LAN 4 accommodated therein. In this way, the MAC frame 6 is received by the terminal 5 indicated by the destination address 61. Upon completion of the transfer of all the cells 7 of one MAC frame 6, the bridge device 1 on the calling side cuts off the call. In addition, the exchange 2 opens the set paths.

It should be noted that the conventional inter-LAN connecting system by means of an ATM switching network is described in detail in Shingaku Giho (phonetically transliterated) Vol. 89, No. 126 "Examination of ATM and MAN Adaptation Functions for LAN Connection" (Jul. 19, 1989, Corporation of Electronic Information Communication Society).

However, the conventional inter-LAN connecting system by means of an ATM switching network suffers from the problems stated below. Each bridge device 1 and the associated exchange 2 need to effect call control processing, e.g., calling and disconnection, for each MAC frame 6 in order to set and open a transfer path for cells 7, so that the processing load is heavy. Further, the transfer waiting time of the MAC frame 6 is lengthened due to the call control processing. In addition, it is necessary to previously register on an address table information required to decide a bridge device 1 accommodating a LAN 4 to which the destination terminal 5 is connected. Accordingly, if the number of terminals is large, enormous information must be set in advance.

In view of the above-described problems of the prior art, it is an object of the present invention to provide an inter-LAN connecting system by means of an ATM switching network which is designed so that a MAC frame can be transferred without the need for a call control processing to thereby shorten the MAC frame transfer waiting time and it is also unnecessary to previously set in a bridge device information that provides correspondence between the destination terminal and a bridge device accommodating a LAN to which this terminal is connected.

SUMMARY OF THE INVENTION

The present invention provides an inter-local area network (LAN) connecting system in which LANs are connected to an asynchronous transfer mode (ATM) switching network by respective bridge devices to effect communication between terminals connected to different LANs through the bridge devices and the switching network, comprising: logical connections set between the bridge devices in advance to transfer cells, which are information units of data transfer; and each of the bridge devices having a first address table on which the addresses of terminals connected to a LAN accommodated in this bridge device are registered and held by learning, a second address table on which the addresses of terminals connected to LANs accommodated in other bridge devices are registered and held by learning in pairs with identifiers that identify logical connections between this bridge device and the other bridge devices, and means for checking the identifier of a received information frame or received cell against the first or second address table to judge the destination in accordance with the registration condition of the first or second address table, and effecting communication on the basis of the result of the judgement.

According to the present invention, when a bridge device transfers an information frame in the form of divided cells, it checks the second address table, and if it is possible to specify a bridge device accommodating a LAN to which the destination terminal is connected, the bridge device on the transmission side designates the identifier of a logical connection that leads to the bridge device on the reception side to transfer the cells, whereas, if it is impossible to specify the remote bridge device, the bridge device broadcasts the information frame by use of the identifiers of all the logical connections that lead to all the other bridge devices, thereby realizing inter-LAN connection by use of preset fixed logical connections without the need for call setup.

BRIEF DESCRIPTION OF THE DRAWINGS

FIGS. 5, 6, 7 and 8 show the operations of bridge devices;

DETAILED DESCRIPTION OF THE PREFERRED EMBODIMENTS

One embodiment of the present invention will be described below with reference to the accompanying drawings.

Figure 1:
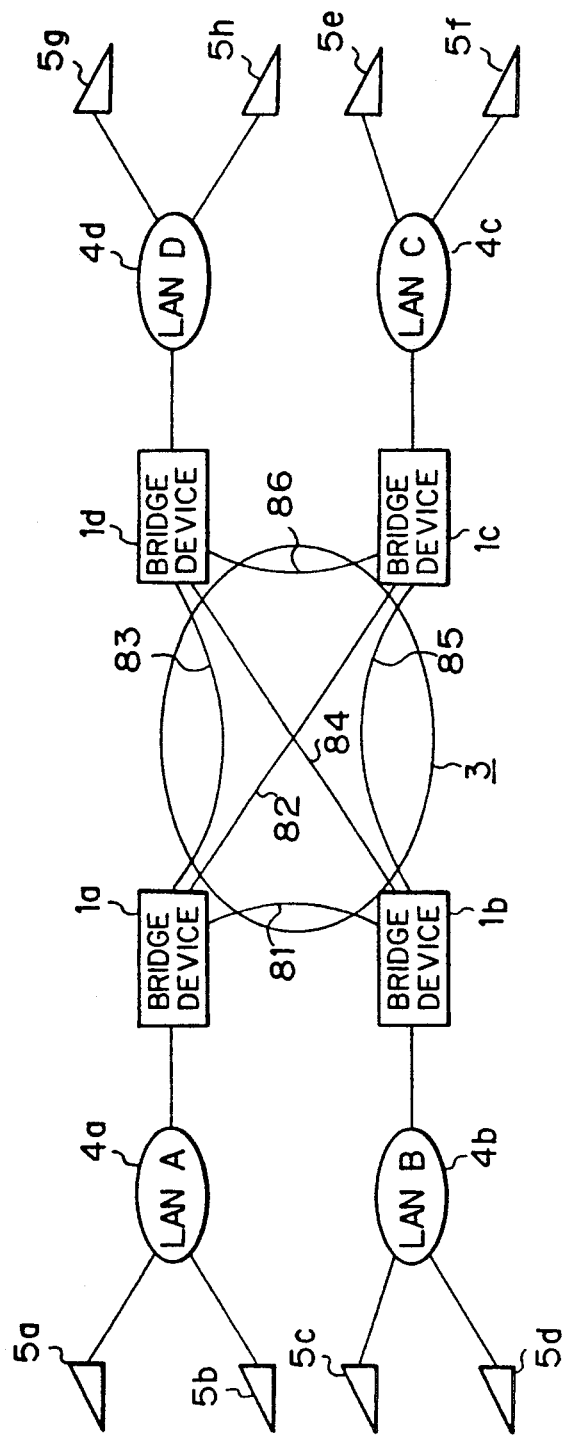
FIG. 1 shows how logical connections are see between bridge devices.

FIG. 1 shows how logical connections are set between bridge devices 1 through an ATM switching network 3. In FIG. 1, reference numerals 81 to 86 denote logical connections, which are set in advance between the bridge devices A (1a) to D·(1d).

Figure 11:
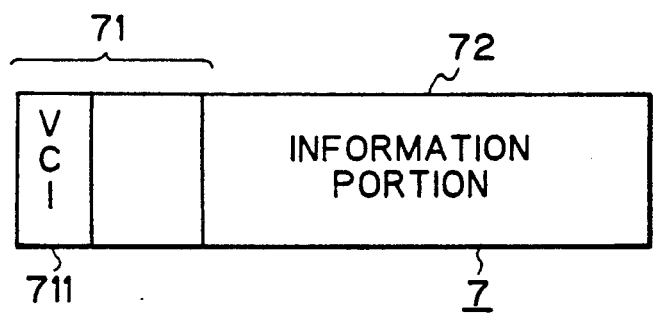
FIG. 11 is a format diagram showing the arrangement of a cell.
Figure 13:
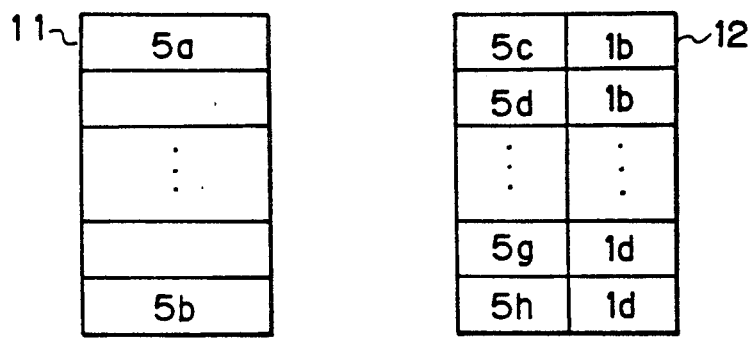
FIG. 13 shows address tables in a conventional bridge device.
Figure 12:
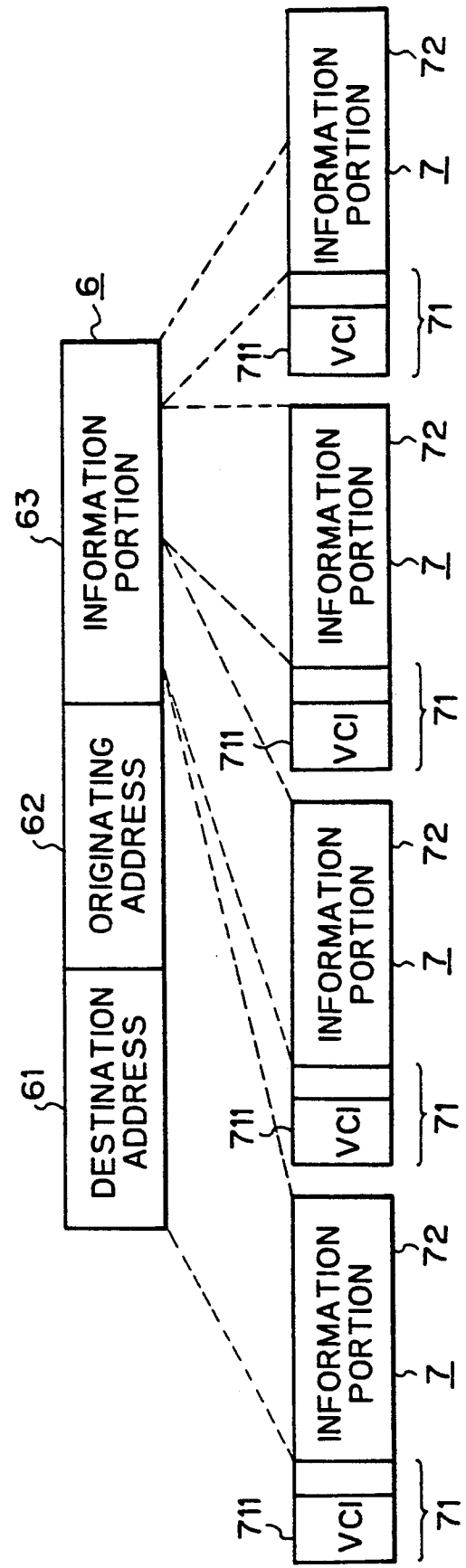
FIG. 12 shows the way in which a MAC frame is divided into cells or restored from cells.

The logical connections are logical paths through which cells 7, shown in FIG. 11 are transferred. The logical connections are identified by the VCIs 711 of cells 7. It is hereinafter assumed that the VCIs 711 of cells 7 that flow on the logical connections 81 to 86 take the values "1" to "6" in correspondence to the logical connections 81 to 86.

Figure 2:
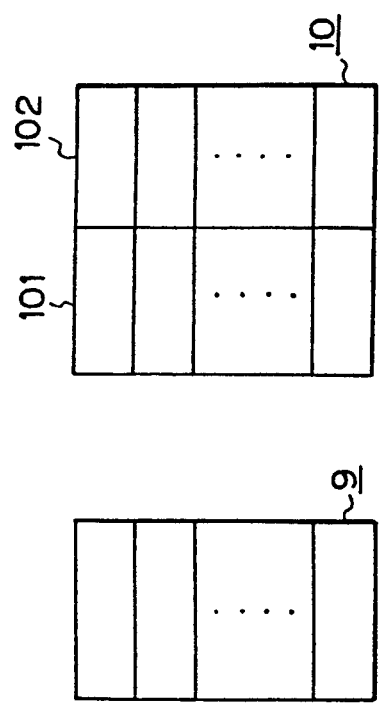
FIG. 2 shows the arrangements of a local address filtering table and remote address filtering table, which are provided in each bridge device.

FIG. 2 shows the arrangement of a first address table (known as "local address filtering table"; hereinafter referred to as "L-AFT") 9 that is provided in each bridge device 1 to register and hold thereon by learning the addresses of terminals 5 connected to a LAN 4 accommodated in the bridge device 1, and the arrangement of a second address table (known as "remote address filtering table"; hereinafter referred to as "R-AFT") 10 that is provided in each bridge device 1 to register and hold thereon by learning the addresses of terminals 5 connected to LANs 4 accommodated in other bridge devices 1 and VCIs 711 that identify logical connections between this bridge device 1 and the other bridge devices 1, the terminal addresses and the VCIs 711 being registered in pairs. More specifically, the L-AFT 9 is a table provided for each bridge device 1 to register by learning the addresses of terminals 5 connected to a LAN 4 accommodated in this bridge device 1, and the R-AFT 10 is a table provided for each bridge device 1 to register by learning the addresses of terminals 5 connected to LANs 4 accommodated in other bridge devices 1 and VCIs 711 that identify logical connections between this bridge device 1 and the other bridge devices 1, the R-AFT 10 comprising a terminal address column 101 and a VCI column 102.

Figure 3:
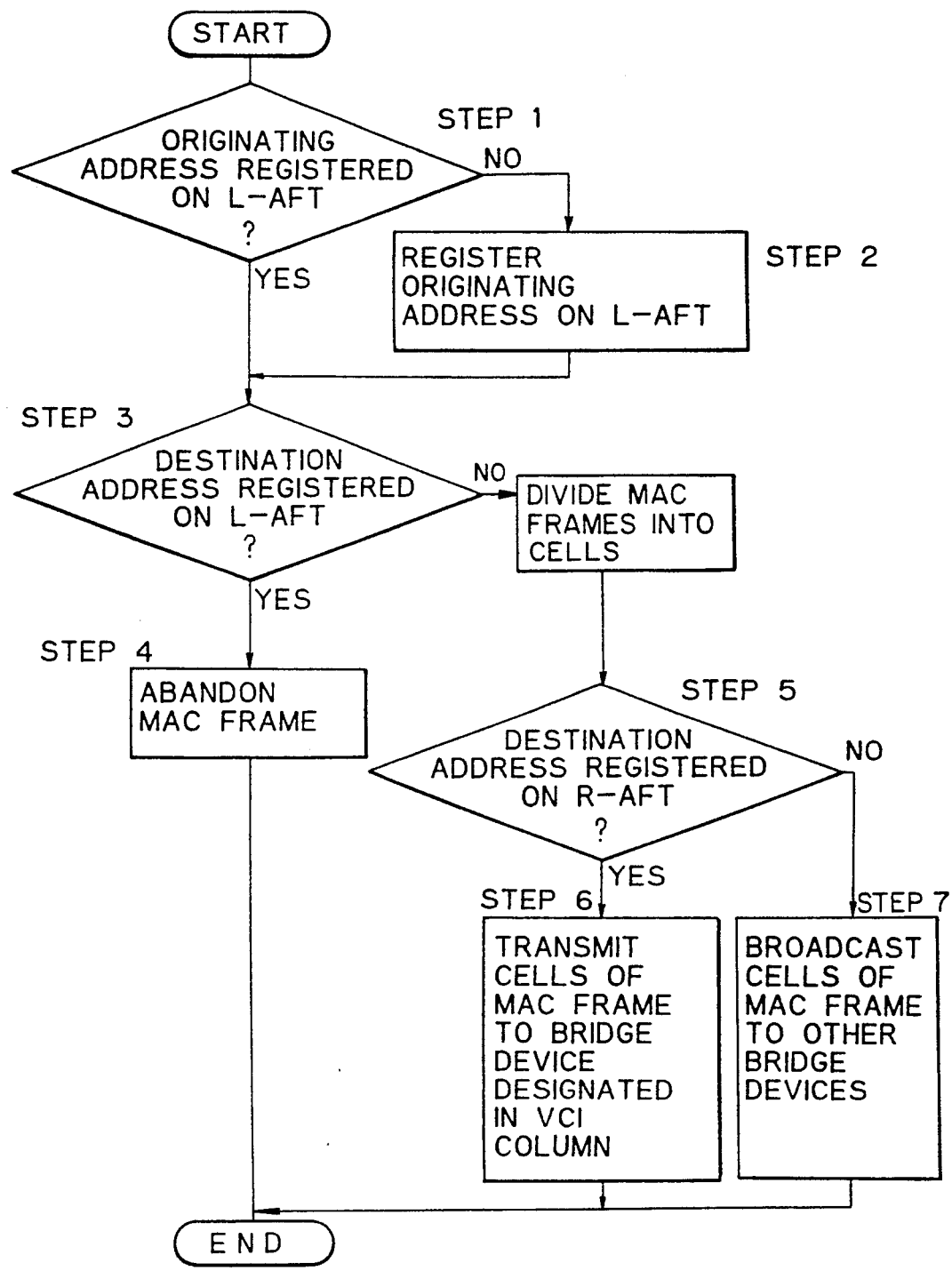
FIG. 3 is a flowchart showing an operation that takes place when a bridge device receives a MAC frame from a LAN.

FIG. 3 is a flowchart showing an operation that takes place when a bridge device 1 receives a MAC frame 6 from the LAN 4 accommodated therein. This operation will be explained below with reference to the flowchart of FIG. 3.

When receiving a MAC frame 6 from the LAN 4 of its own, a bridge device 1 checks the originating address 62 of the received MAC frame 6 against the L-AFT 9 (Step 1). If the originating address 62 has not been registered thereon, the bridge device 1 registers it on the L-AFT 9 (i.e., learning of a terminal address) (Step 2). Further, the bridge device 1 checks the destination address 61 against the L-AFT 9. If the destination address 61 is found therein, it means that the destination terminal 5 is connected to the LAN 4 accommodated in this bridge device 5, and the received MAC frame 6 is therefore abandoned (Step 4). If the destination address 61 has not been registered, the bridge device 1 divides the MAC frame 6 into cells 7. At this time, the bridge device 1 checks whether or not the destination address 61 is contained in the terminal address column 101 of the R-AFT 10 (Step 5). If YES, the value in the VCI column 102 that is paired with the destination address 61 in the terminal address column 101 is set in the VCI 711 off each of the divided cells 7, and these cells 7 are transmitted only to the bridge device 1 accommodating the LAN 4 to which the destination terminal 5 is connected (Step 6). If the destination address 61 has not been registered in the terminal address column 101 of the R-AFT 10, the cells 7 are broadcast to all the other bridge devices 1 (Step 7).

Figure 4:
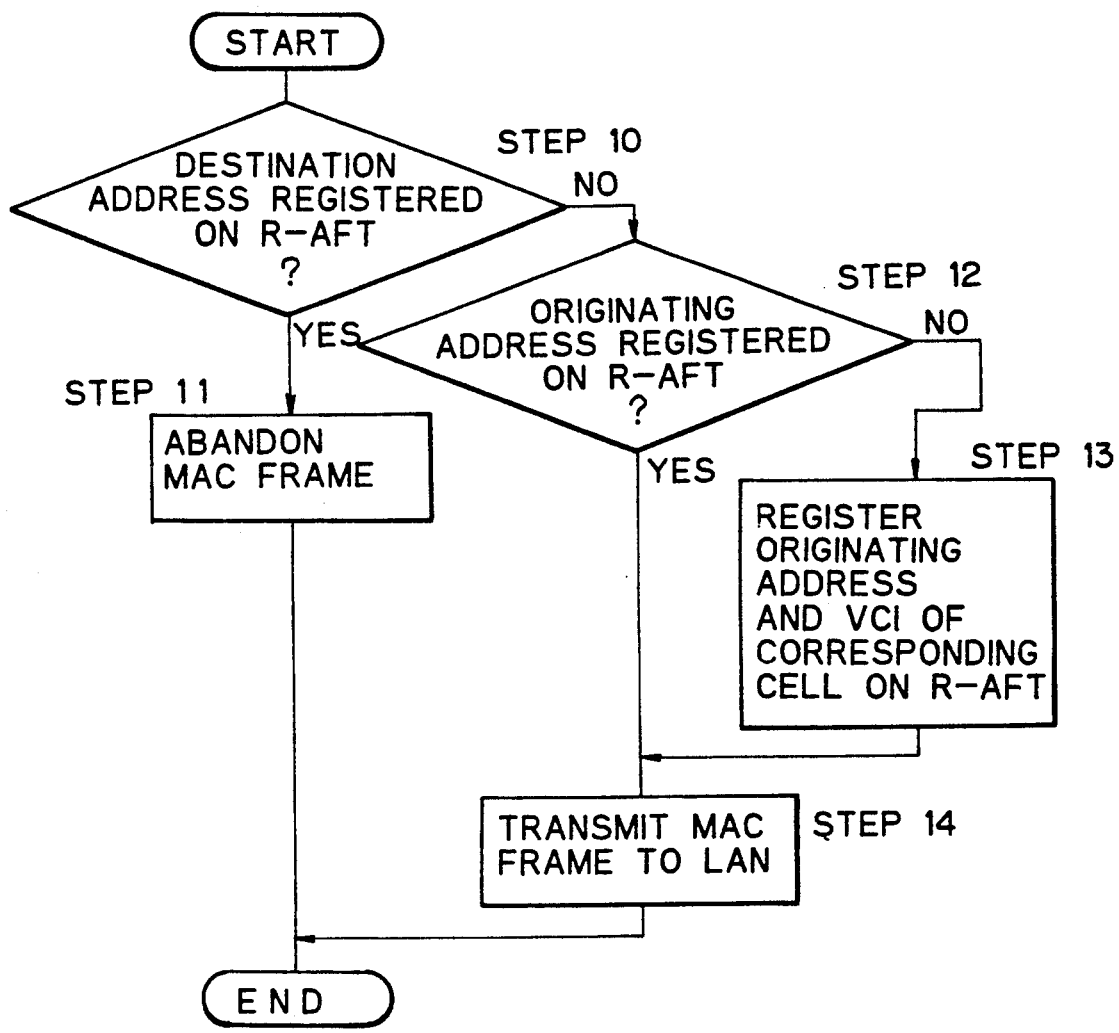
FIG. 4 is a flowchart showing an operation that takes place after a bridge device restores cells received from an ATM switching network to a MAC frame.
Figure 5:
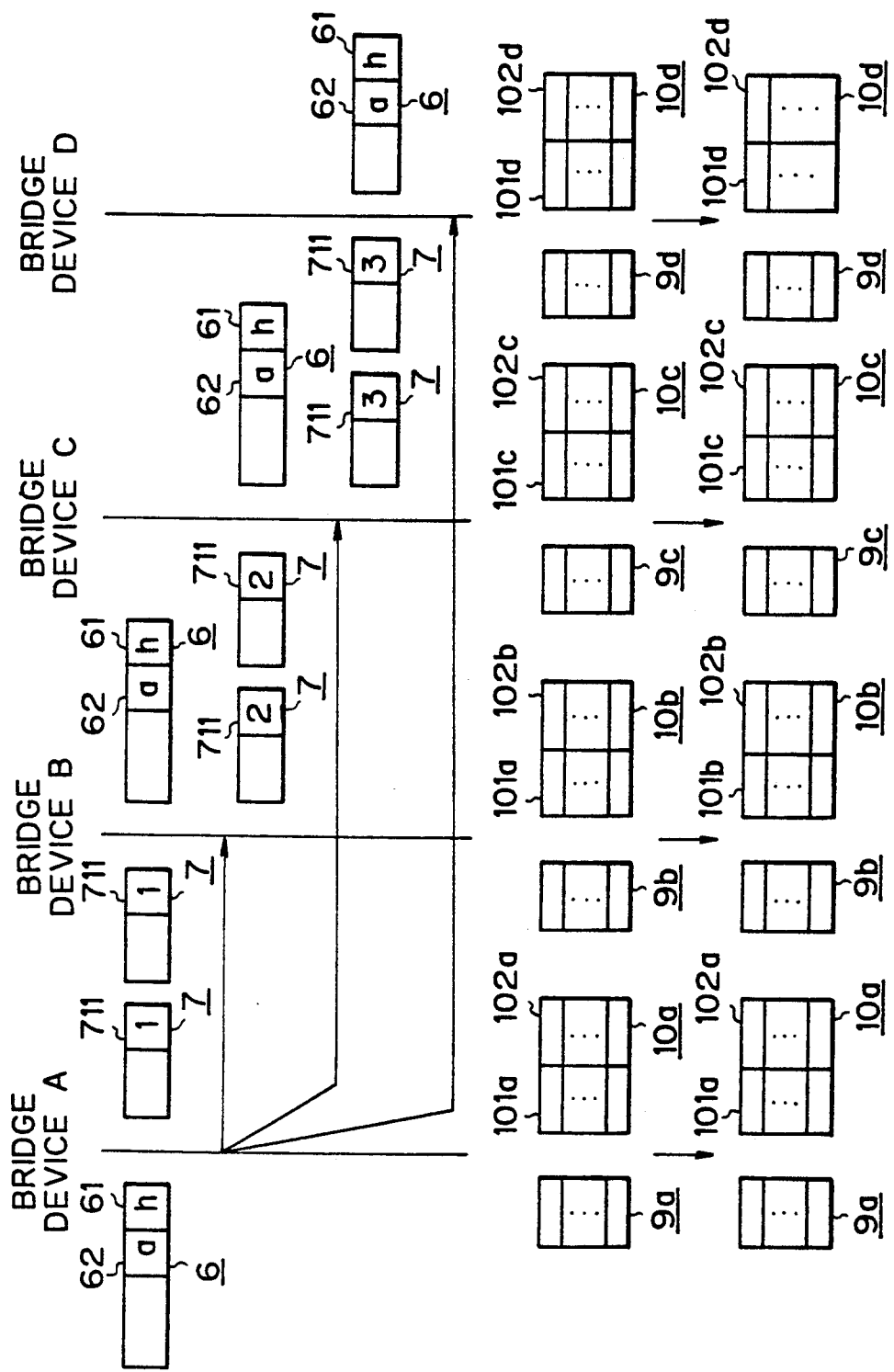
Figure 6:
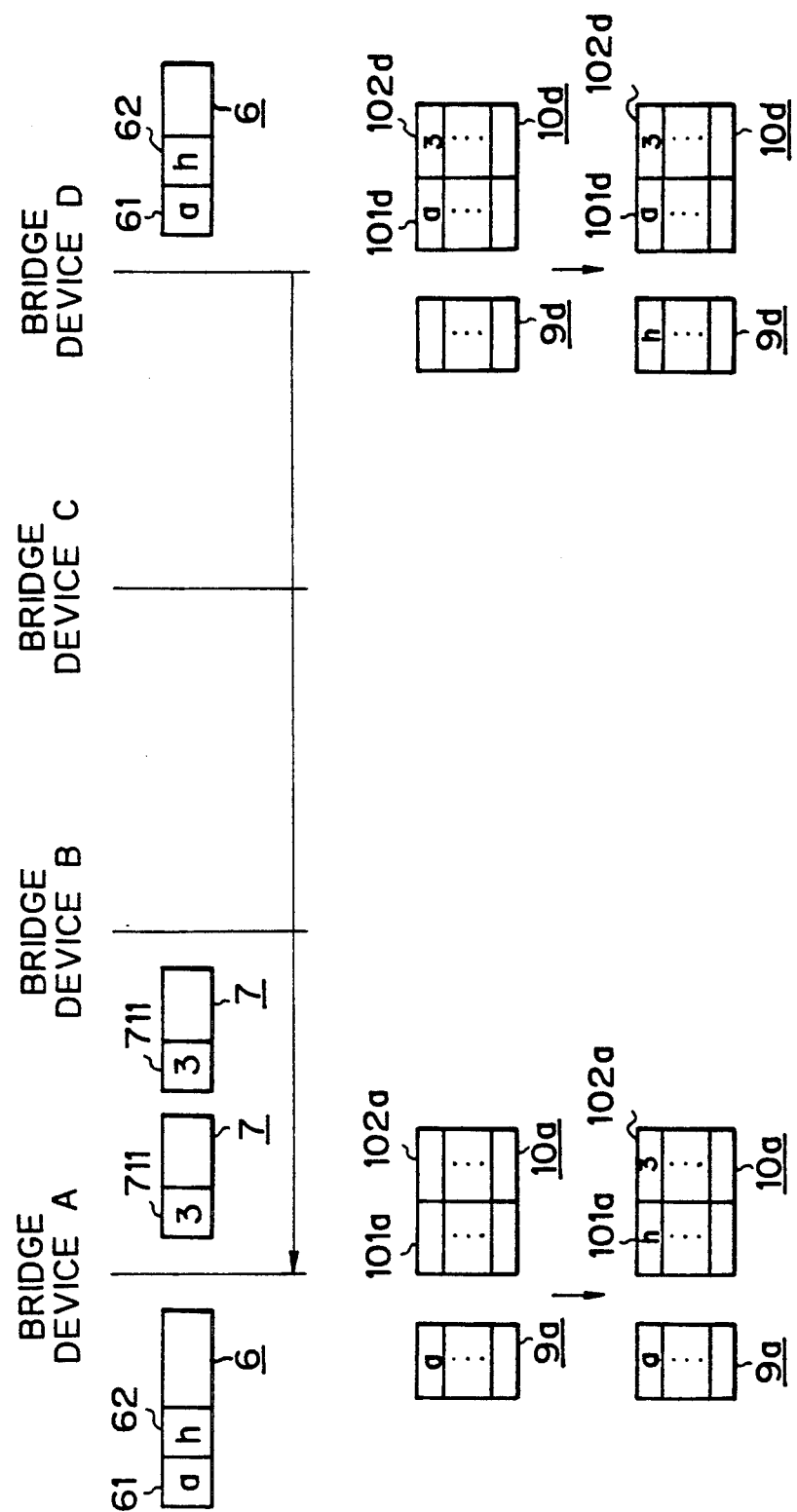
Figure 9:
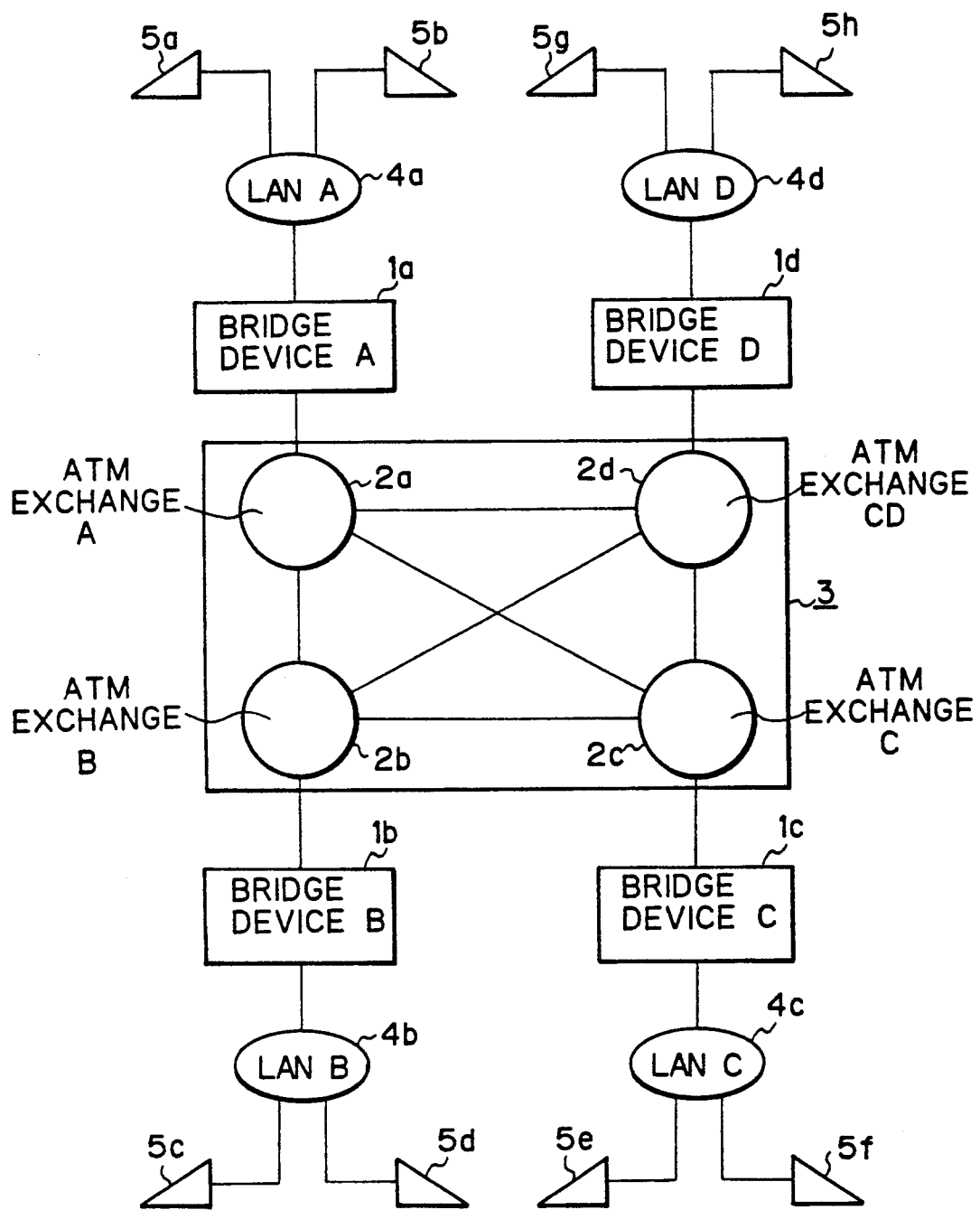
FIG. 9 is a block diagram of a conventional system for connecting LANs by an ATM switching network.
Figure 10:
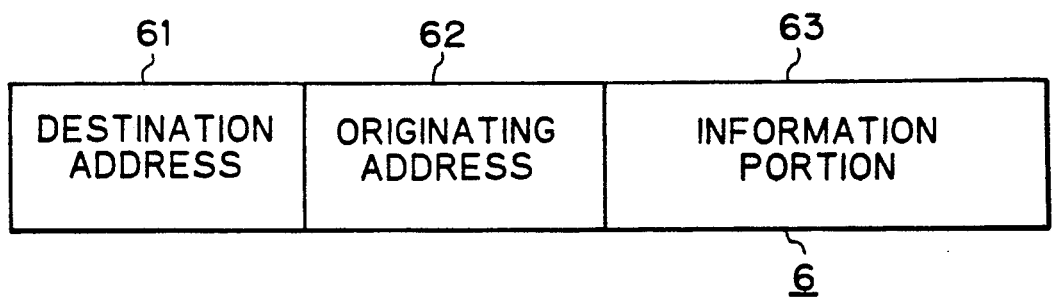
FIG. 10 is a format diagram showing the arrangement of a MAC frame.

FIG. 4 is a flowchart showing an operation that takes place after a bridge device 1 restores cells 7 received from the ATM switching network 3 to a MAC frame 6. This operation will be explained below with reference to the flowchart of FIG. 4.

The bridge device 1 checks the destination address 61 of the restored MAC frame 6 against the terminal address column 101 of the R-AFT 10. If the destination address 61 has been registered thereon, it means that the destination terminal 5 is connected to a LAN 4 accommodated in another bridge device 1, and the MAC frame 6 is therefore abandoned (Step 11). If the destination address 61 has not been registered in the terminal address column 101, the bridge device 1 then checks whether or not the originating address 62 has been registered in the terminal address column 101 (Step 12).

If NO, the bridge device 1 registers the originating address 62 and the VCI 711 of each cell 7 in the terminal address column 101 and the VCI column 102, respectively (i.e., learning of a terminal address and VCI) (Step 13). Thereafter, the bridge device 1 transfers the MAC frame 6 to the LAN 4 accommodated therein (Step 14).

FIGS. 5 to 8 show the operations of the bridge devices 1. The operations of the bridge devices 1 will be explained below with reference to these figures by way of one example in which some MAC frames 6 are alternately exchanged between the terminals a and h. It is hereinafter assumed that no information has been registered on the L-AFT 9 and the R-AFT 10 of each bridge device 1 in the initial state and that each MAC frame 6 is divided into two cells 7.

When receiving a MAC frame 6 addressed to the terminal h (5h) from the terminal a (5a) (see FIG. 5), the bridge device A (1a) registers the originating address 62, i.e., "a", on the L-AFT a (9a). Since the destination address 61. i.e., "h", is not contained in either of the L-AFT a (9a) and the R-AFT a (10a), the bridge device A (1a) broadcasts the cells 7 to all the bridge devices B (1b) to D (1d) by use of the broadcasting logical connections 81, 82 and 83. Since the destination address 61, i.e., "h", of the MAC frame 6 restored from the cells 7 is not contained in the R-AFT d (10d), the bridge device D (1d) transfers the MAC frame 6 to the LAN 4. At this time, the bridge device D (1d) registers the originating address 62, i.e., "a", and the VCI 711, i.e., "3", of each cell 7 in the terminal address column d (101d) and the VCI column d (102d), respectively. The bridge devices B (1b) and C (1c) perform a similar operation.

When subsequently receiving a MAC frame 6 addressed to the terminal a (5a) from the terminal h (5h) (see FIG. 6), the bridge device D (1d) registers the originating address 62, i.e., "h", on the L-AFT d (9d). Since the destination address 61, i.e., "a", is not contained in the L-AFT d (9d), the bridge device D (1d) divides the MAC frame 6 into cells 7. Further, since "a" is contained in the terminal address column d (101d), the bridge device D (1d) sets "3", which has been registered in the VCI column d (102d) in pair with "a", in the VCI 711 of each cell 7 and transmits the cells 7 only to the bridge device A (1a) through the point-to-point logical connection 83. Since the destination address 61, i.e., "a", of the MAC frame 6 restored from the cells 7 is not contained in the R-AFT a (10a), the bridge device A (1a) transfers the MAC frame 6 to the LAN 4. At this time, the originating address 62, i.e., "h", and the VCI 711, i.e., "3", of each cell 7 are registered in the terminal address column a (101a) and the VCI column a (102a), respectively.

When subsequently receiving a MAC frame 6 addressed to the terminal h (5h) from the terminal a (5a) (see FIG. 7), the bridge device A (1a) divides the MAC frame 6 into cells 7 since the destination address 61, i.e., "h", is not contained in the L-AFT a (9a). Since "h" is contained in the terminal address column a (101a), the bridge device A (1a) sees "3", which has been registered in the VCI column a (102a), in the VCI 711 of each cell 7 and transmits the cells 7 only to the bridge device D (1d) through the logical connection 83. Since the destination address 61, i.e., "h", of the MAC frame 6 restored from the cells 7 is not contained in the R-AFT d (10d), the bridge device D (1d) transfers the MAC frame 6 to the LAN 4.

Thereafter, when receiving a MAC frame 6 addressed to the terminal a (5a) from the terminal b (5b) (see FIG. 8), the bridge device A (1a) registers the originating address 62, i.e., "b", on the L-AFT a (9a) and abandons the MAC frame 6 since the destination address 61, i.e., "a", is contained in the L-AFT a (9a). Further, when receiving a MAC frame 6 addressed to the terminal b (5b) from the terminal a (5a), the bridge device A (1a) abandons the MAC frame 6 since the destination address 61, i.e., "b", is contained in the L-AFT a (9a).

As has been described above, according to the present invention, each bridge device is arranged to register on address tables by Learning the addresses of terminals connected to a LAN accommodated therein and the addresses of terminals connected to LANs accommodated in other bridge devices, together with VCIs of logical connectins between this bridge device and other bridge devices. Accordingly, no call control processing is needed to transfer an information frame, so that the information frame transfer waiting time can be shortened. In addition, it becomes unnecessary to set in advance information that provides correspondence between the address of the destination terminal and a bridge device accommodating a LAN to which this destination terminal is connected.

What is claimed is:

1. An inter-local area network (LAN) connecting system in which LANs are connected to an ATM asynchronous transfer mode, switching network by respective bridge devices to effect communication between terminals connected to different LANs through said bridge devices and said switching network, comprising:

logical connections set between said bridge devices in advance to transfer cells, which are information units of data transfer; and each of said bridge devices having means for dividing an information frame received from a terminal connected to a LAN accommodated in this bridge device into a plurality of cells and sending out said cells to said ATM switching network, means for restoring an information frame from a plurality of cells received from said ATM switching network and sending out said restored information frame to the LAN accommodated in this bridge device, a first address table on which the addresses of terminals connected to the LAN accommodated in this bridge device are registered and held by learning, a second address table on which the addresses of terminals connected to LANs accommodated in other bridge devices are registered and held by learning in pairs with identifiers that identify logical connections between this bridge device and other bridge devices, means for checking address information of an information frame received from a terminal connected to the LAN accommodated in this bridge device or address information of an information frame restored from a plurality of cells received from said ATM switching network against said first or second address table, said checking means for checking each table separately in a predetermined sequence, means for determining the destination in accordance with the registration condition of said first or second address table, and means for effecting communication on the basis of the result of the determination.

2. An inter-LAN connecting system according to claim 1, wherein said information frame has a destination address and an originating address, while the identifier of each cell is a virtual channel identifier, and wherein said means for effecting communication further has means for checking whether or not the originating address of said information frame received from said LAN has been registered on said first address table, and for registering, if it has not, said originating address on said first address table, and further for checking whether or not the destination address and originating address of said restored information frame have been registered on said second address table, and for registering, if both said addresses have not been registered, said originating address and said VCI on said second address table, thereby realizing registration and holding of information on said first and second address tables by learning.

3. An inter-LAN connecting system according to claim 2, wherein said means for effecting communication further has means for checking whether or not the destination address of said information frame received from said LAN has been registered on said first and second address tables, for abandoning said information frame if said destination address has been registered on said first address table, for transmitting, if said destination address has not been registered on said first address table but it has been registered on said second address table, said information frame to the bridge device designated by the VCI registered on said second address table, and for broadcasting said information frame to all the other bridge devices if said destination address has not been registered on either of said first and second address tables, said checking means further for checking whether or not the destination address of said restored information frame has been registered on said second address table, for abandoning said information frame if said destination address has been registered thereon, and for transferring said information frame to said LAN if said destination address has not been registered on said second address table.

4. An inter-local area network LAN connecting method in which LANs are connected to an asynchronous transfer mode (ATM) switching network by respective bridge devices to effect communication of an information frame between terminals connected to different LANs through said bridge device and said switching network, wherein logical connections are set between said bridge devices in advance to transfer cells, which are information units of data transfer, said information frame including a destination address, an originating address and an information portion, said information frame being divided into a plurality of cells in said bridge devices so as to be exchanged therebetween and also restored from a plurality of cells exchanged, said cells each including a virtual channel identifier (VCI), each of said bridge device having a first address table on which the addresses of terminals connected to a LAN accommodated in this bridge device are registered and held by learning, and a second address table on which the addresses of terminals connected to LANs accommodated in other bridge devices are registered and held by learning in pairs with identifiers that identify logical connections between this bridge device and the other bridge devices, said method comprising the steps of:

checking whether or not the originating address of said information frame received from said LAN has been registered on said first address table, and registering, if it has not, said originating address on said first address table, checking whether or not the destination address of said information frame received from said LAN has been registered on said first address table, abandoning said information frame if it has been registered on said first address table, checking whether or not the destination address of said information frame received from said LAN as been registered on said second address table in response to a determination that the destination address is not registered on said first address table, transmitting, if said destination address has not been registered on said first address table but it has been registered on said second address table, said information frame to the bridge device designated by the VCI registered on said second address table, and broadcasting said information frame to all the other bridge devices if said destination address has not been registered on either of said first and second address tables, checking whether or not the destination address of the restored information frame has been registered on said second address table, abandoning said information frame if it has been registered thereon, checking whether or not the originating address of said restored information frame has been registered on said second address table if said destination address has not been registered thereon, registering said originating address and said VCI on said second address table if said originating address has not been registered thereon, and transferring said information frame to said LAN as it is if said originating address has been registered on said second address table.

5. An inter-local area network (LAN) connecting system in which LANs are connected to an asynchronous transfer mode (ATM) switching network by respective bridge devices to effect communication between terminals connected to different LANs through said bridge devices and said switching network, said system comprising:

logical connections set between said bridge devices in advance to transfer cells, which are information units of data transfer; and each of said bridge devices having a first address table on which the addresses of terminals connected to a LAN accommodated in this bridge device are registered and held by learning, a second address table on which the addresses of terminals connected to LANs accommodated in other bridge devices are registered and held by learning in pairs with identifiers that identify logical connections between this bridge device and the other bridge devices, and means for checking the identifier of a received information frame or received cell against said first or second address table to judge the destination in accordance with the registration condition of said first or second address table, and effecting communication on the basis of the result of the judgment, said checking means for checking the first address table first, and the second address table in response to a determination that the destination is not stored on the first address table.

6. A method for transferring information among terminals connected to inter-local area networks (LANs) connected to bridge devices to transfer information in information frames between terminals connected to different LANs through the bridge devices, the information frames having destination addresses, the method comprising the steps of:

providing an information frame having a destination address to a bridge device from a first terminal coupled to a first LAN;

checking a first address table to determine whether the destination address indicates a terminal coupled to the first LAN;

checking, in response to a determination that the destination address is not on the first address table, a second address table having addresses of terminals not connected to the first LAN;

routing the information to an appropriate terminal based on the checking steps.

7. An inter-local area network (LAN) connection system in which LANs are connected to bridge devices to transfer information in information frames between terminals connected to different LANs through the bridge devices and the switching network, the information frames having destination addresses, the system comprising:

a first LAN;

a first group of terminals connected to the first LAN;

a second LAN;

a second group of terminals connected to the second LAN;

a bridge device coupled to the first LAN, the bridge device having a first address table having addresses of the first group of terminals, a second address table having addresses of the second group of terminals, means for checking the first address table to determine whether the information frame has a destination address indicating one of the first group of terminals, means for checking the second address table only if the destination address does not indicate the first group of terminals, and means for transferring the information to a terminal indicated by the destination address based on the means for checking.

* * * * *